US012065952B2

(12) United States Patent
Defossez et al.

(10) Patent No.: US 12,065,952 B2
(45) Date of Patent: Aug. 20, 2024

(54) MUFFLER COMPRISING ONE OR MORE SENSOR PORTS

(71) Applicant: CNH Industrial America LLC, New Holland, PA (US)

(72) Inventors: Koen Defossez, Kuurne (BE); Lode A. Demonie, Staden (BE)

(73) Assignee: CNH Industrial America LLC, New Holland, PA (US)

( * ) Notice: Subject to any disclaimer, the term of this patent is extended or adjusted under 35 U.S.C. 154(b) by 36 days.

(21) Appl. No.: 17/855,783

(22) Filed: Jun. 30, 2022

(65) Prior Publication Data
US 2023/0003148 A1    Jan. 5, 2023

(30) Foreign Application Priority Data

Jun. 30, 2021 (EP) .................................... 21183001

(51) Int. Cl.
*F01N 1/02* (2006.01)
*F01N 13/00* (2010.01)
*F16J 15/02* (2006.01)

(52) U.S. Cl.
CPC ............. *F01N 1/02* (2013.01); *F01N 13/008* (2013.01); *F16J 15/02* (2013.01)

(58) Field of Classification Search
CPC . F01N 13/008; F01N 1/00; F01N 1/02; F01N 13/141; F01N 2560/00; F16J 15/02
See application file for complete search history.

(56) References Cited

U.S. PATENT DOCUMENTS

| 5,615,551 | A | * | 4/1997 | Matsushima | ......... F01N 3/2853 60/299 |
| 5,832,723 | A | | 11/1998 | Iwata et al. | |
| 9,217,355 | B2 | * | 12/2015 | Boahene | ............... F01N 13/008 |
| 10,781,740 | B2 | * | 9/2020 | Röhr | ................... F01N 13/1838 |

(Continued)

FOREIGN PATENT DOCUMENTS

| CN | 108150266 A | 6/2018 |
| DE | 4100935 A1 | 7/1992 |

(Continued)

OTHER PUBLICATIONS

Extended European Search Report for EP Application No. 21183001.3 dated Nov. 29, 2021 (7 pages).

*Primary Examiner* — Anthony Ayala Delgado
(74) *Attorney, Agent, or Firm* — Peter K. Zacharias; Rebecca L. Henkel; Rickard K. DeMille

(57) ABSTRACT

A sealing assembly for a sensor port of a double-walled muffler. The assembly includes at least an outer plate and a washer-type element. The washer-type element has a planar portion provided with an aperture, and a tube portion protrudes from an edge of the aperture. The assembly is mounted on a sensor port provided with a boss fixed to an inner wall of the double muffler wall, and with an opening in an outer wall surrounding the boss. The tube portion is fitted over the boss, and the assembly is fixed to the outer wall. Any radial or lateral movement of the boss relative to the outer wall is able to take place without losing sealing function, due to lateral freedom of movement of the washer-type element relative to the outer plate, and due to the fact that the boss is able to move relative to the tube portion.

20 Claims, 7 Drawing Sheets

(56) References Cited

U.S. PATENT DOCUMENTS

| | | |
|---|---|---|
| 10,823,036 B1* | 11/2020 | Egan ................ F01N 13/008 |
| 2003/0226412 A1 | 12/2003 | Rumminger et al. |
| 2007/0178026 A1* | 8/2007 | Roth ................ B01D 53/9454 |
| | | 422/177 |
| 2011/0047998 A1 | 3/2011 | Adachi |
| 2012/0128409 A1* | 5/2012 | Inayama ............ F01N 13/1827 |
| | | 403/288 |
| 2014/0331658 A1 | 11/2014 | Adupala et al. |
| 2015/0007554 A1 | 1/2015 | Frijas |
| 2015/0059457 A1* | 3/2015 | Niaz .................... F01N 3/02 |
| | | 73/114.71 |
| 2015/0300233 A1* | 10/2015 | Bowers ............... F01N 13/008 |
| | | 60/320 |
| 2017/0335743 A1 | 11/2017 | Addanki et al. |
| 2017/0363023 A1* | 12/2017 | Arima ................ F01N 13/008 |
| 2018/0087429 A1 | 3/2018 | Nakamura et al. |
| 2018/0274468 A1 | 9/2018 | Zhao et al. |
| 2019/0101041 A1 | 4/2019 | Willats et al. |
| 2019/0264597 A1* | 8/2019 | Röhr .................. F01N 13/1838 |
| 2020/0217236 A1* | 7/2020 | Hudgens ............ F01N 13/1855 |
| 2021/0115835 A1 | 4/2021 | Diehl et al. |

FOREIGN PATENT DOCUMENTS

| | | |
|---|---|---|
| DE | 102008017625 A1 | 10/2009 |
| DE | 102010060071 A1 | 5/2012 |
| EP | 2489847 A2 | 8/2012 |
| JP | H08296436 A | 11/1996 |
| JP | 2002285838 A | 10/2002 |
| JP | 2007023850 A | 2/2007 |
| JP | 2020197172 A | 12/2020 |
| WO | 2011/118527 A1 | 9/2011 |
| WO | 2020174484 A1 | 9/2020 |

\* cited by examiner

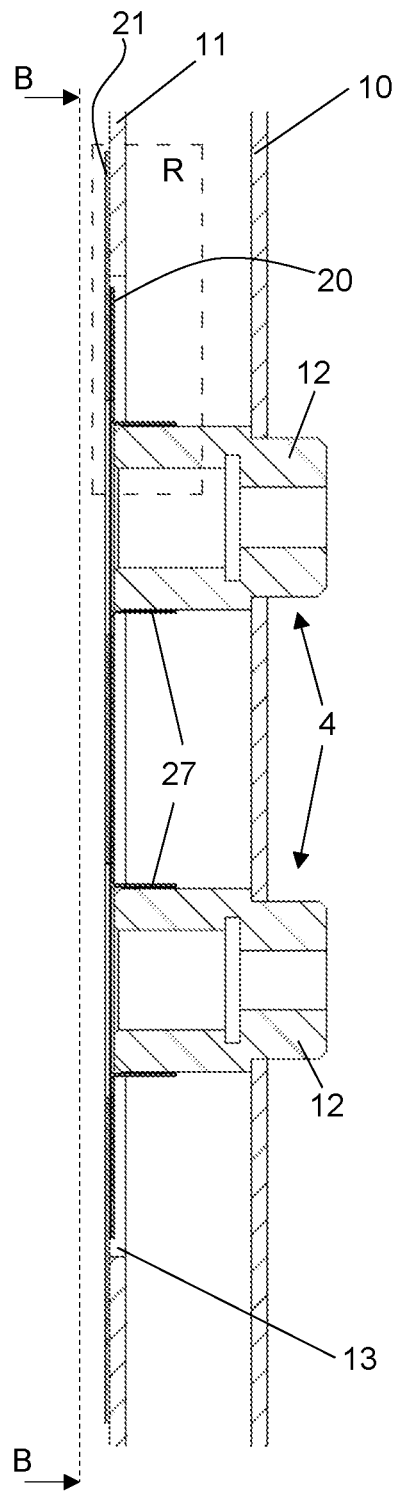
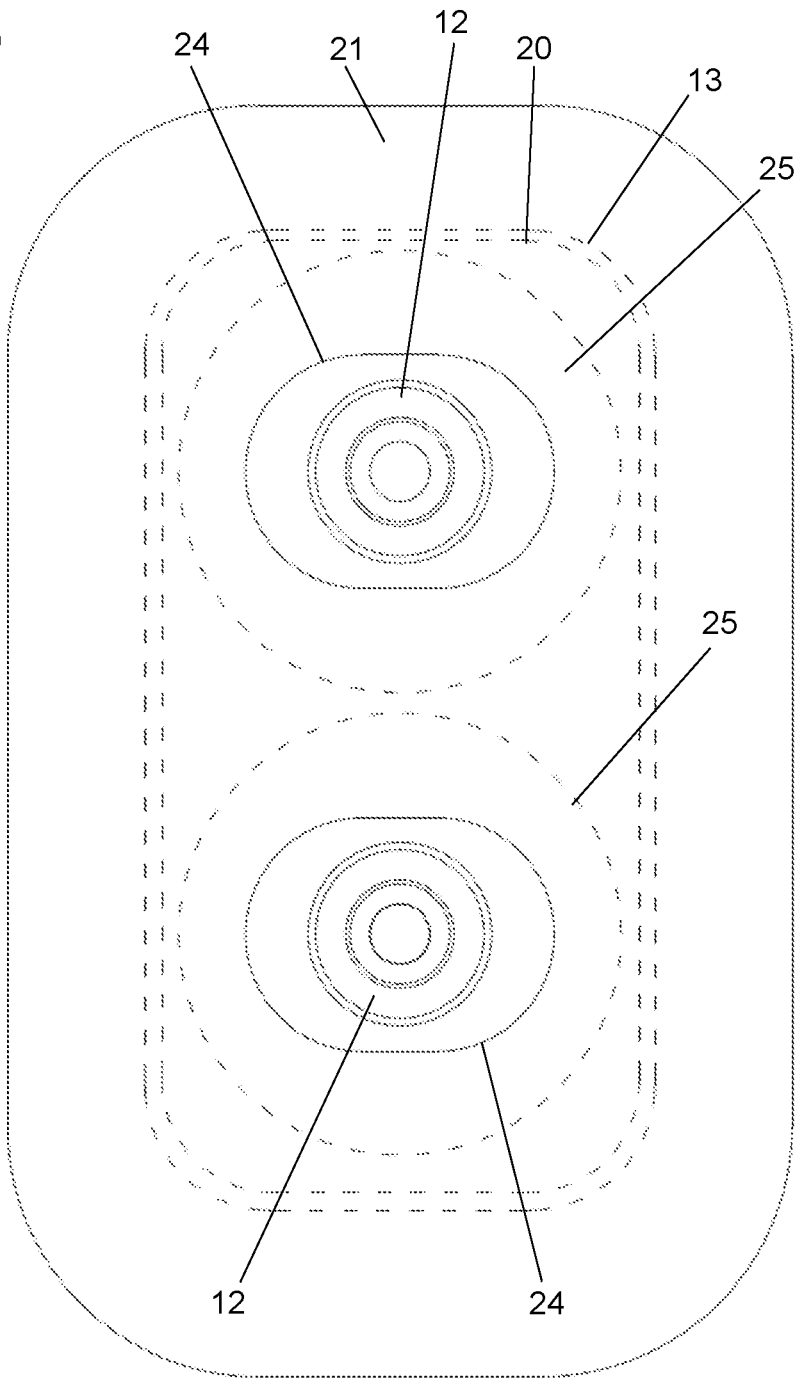
FIG. 5a
FIG. 5b

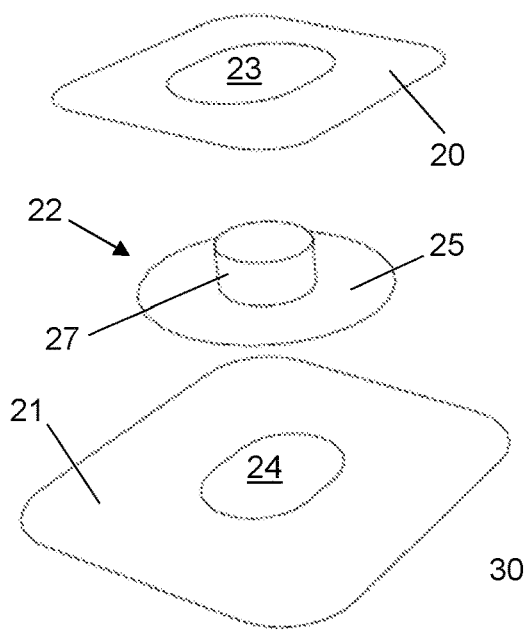
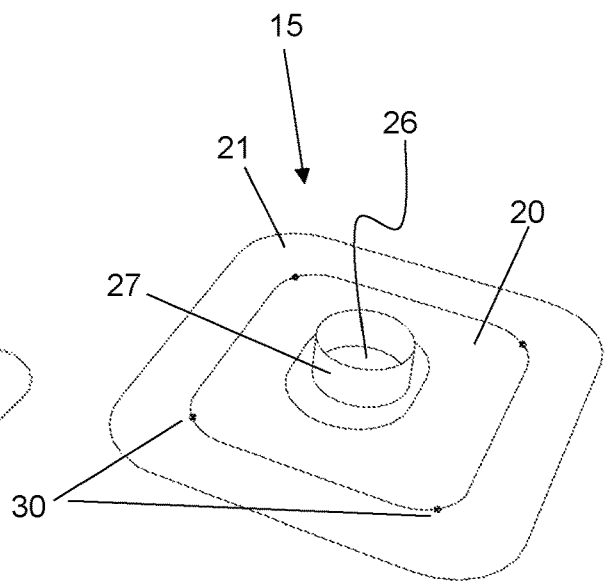
FIG. 8a　　　　　　　　FIG. 8b
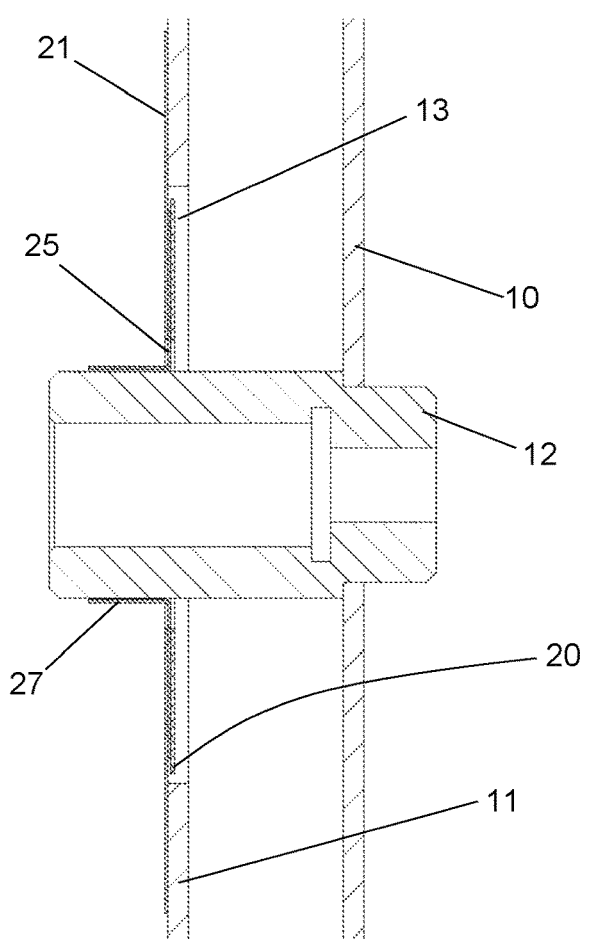
FIG. 9

MUFFLER COMPRISING ONE OR MORE SENSOR PORTS

FIELD OF THE INVENTION

The present invention is related to acoustic mufflers, primarily to engine exhaust mufflers, in particular to the mounting of sensors on a double-walled muffler. Such sensors may be used to measure operational parameters of the muffler, such as NOx concentration, NH3 concentration, temperature, pressure, etc.

BACKGROUND OF THE INVENTION

It is well-known to design an engine exhaust muffler in the form of an elongated cylinder with a double-walled shell formed of an inner wall and an outer wall, preferably with a thermal insulation material between the two, in order to limit the temperature of the muffler's outer surface and/or to raise the temperature inside for optimizing the exhaust gas conversion process. When a sensor is mounted on the muffler, this sensor is mounted in a sensor port comprising a boss that is usually welded inside an opening provided in the inner wall. The boss may be provided with an inner thread into which the sensor casing can be screwed so that the sensing portion of the sensor is inserted in the inner volume of the muffler. On the opposite side, the sensor must be accessible in order to connect it to a measurement unit. To this aim, an opening is provided through the outer wall.

Due to the gap between the walls and even more so when the gap is filled with insulation material, an important temperature difference appears between the inner and outer walls of the muffler, once the muffler reaches an operational temperature. As a consequence of this, the inner and outer wall undergo important dimensional shifts with respect to each other, both in the axial direction and in the radial direction of the muffler. The opening provided in the outer wall therefore needs to be considerably larger than the area required for accessing the sensor, so that the relative shift of the walls can take place without damaging the sensor or its connection towards the measurement unit.

Especially in large mufflers, such as the ones used in large agricultural machines, for example combine or forage harvesters, the relative shifts between the inner and outer walls can be in the order of several millimetres, requiring therefore a large gap between the sensor and the outer wall, i.e. a large opening in the outer wall surrounding the boss of the sensor port.

This opening gives access to dirt or debris, leading to a fire hazard as dirt or dust particles come into contact with the high temperature of the muffler's inner wall. This problem is particularly acute in working environments containing high amounts of dirt or debris particles, such as in an agricultural context.

SUMMARY OF THE INVENTION

The invention is related to a muffler in which the above-described problems have been resolved. The present invention is related to a sealing assembly for a sensor port of a double-walled muffler, and to a muffler provided with such a sealing assembly, as disclosed in the appended claims. The sealing assembly comprises at least an outer plate and a washer-type element, preferably all made of thin steel plate material, for example stainless steel plate of about 0.3 mm thickness. According to an embodiment, the assembly further comprises an inner plate. In that case, the plates are assembled one on top of the other and have overlapping openings. The washer-type element has a planar portion provided with an aperture, and a tube portion protruding from the edge of the aperture. The planar portion is caught between the plates or between the single outer plate and the muffler. The assembly is configured in a manner that allows a lateral movement of the washer-type element relative to the plate or plates. The assembly is mounted on a sensor port that is provided with a boss fixed to the inner wall of the double muffler wall, and with an opening in the outer wall surrounding the boss. The tube portion is fitted over the boss and the single plate or the assembly of the plates is fixed to the outer wall of the muffler, thereby closing off the sensor port from the exterior of the muffler. Any radial or lateral movement of the boss relative to the outer wall is able to take place without losing the sealing function, due to the lateral freedom of movement of the washer-type element relative to the plate or plates, and due to the fact that the boss is able to move relative to the tube portion in a direction perpendicular to the plate or plates, i.e. in a radial direction of the muffler.

The sealing assembly thereby effectively closes off the sensor port, while still allowing any movement of the boss relative to the outer wall, as a consequence of the temperature difference between the inner and outer wall.

BRIEF DESCRIPTION OF THE FIGURES

FIG. 5a is a section view of the sealing assembly and the sensor ports, with the assembly mounted thereon.

FIG. 5b is a frontal view of the sensor ports with the assembly mounted thereon.

FIGS. 8a and 8b are views prior and after assembling the components, of a sealing assembly according to the invention, configured to close off a single sensor port.

FIG. 9 illustrates an embodiment wherein the tube portion of the movable washer of the sealing assembly is oriented away from the muffler's outer wall.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
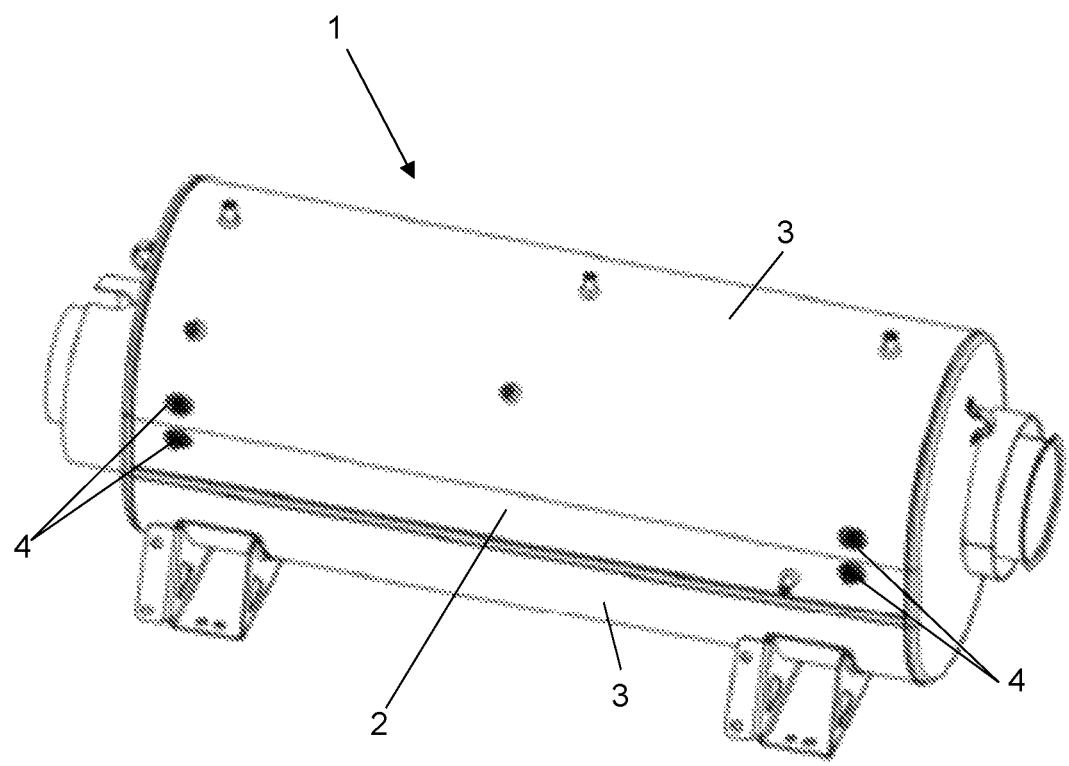
FIG. 1 is an image of a prior art muffler that is suitable for use in an agricultural machine such as a combine harvester.

FIG. 1 shows an example of a large engine exhaust muffler 1 as known in the prior art, and in use today in large agricultural machines such as combine harvesters. The muffler 1 has a tubular shape having a length of about 1.2 m and an outer shell having straight side walls 2 and curved upper and lower sections 3. Inside the muffler is an exhaust trajectory that may be in accordance with any known design.

Figure 2A:
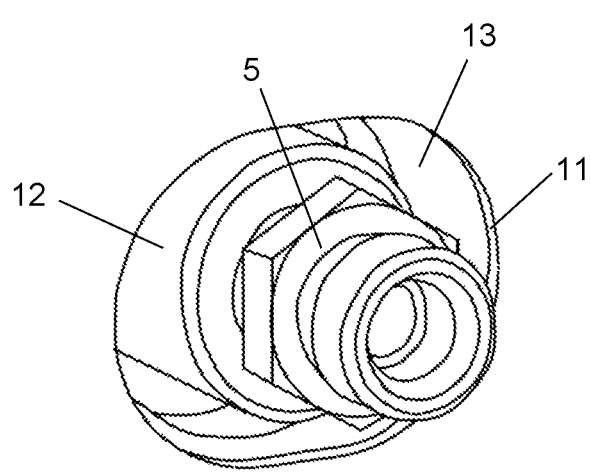
FIG. 2a is a detail of a sensor port in the muffler shown in FIG. 1.
Figure 2B:
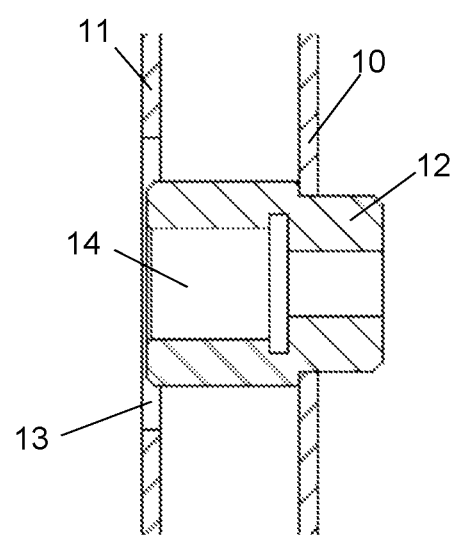
FIG. 2b is a section view of the sensor port.

A pair of sensor ports 4 is provided near the inlet and another pair of sensor ports 4 is provided near the outlet of the muffler 1. FIG. 2a shows a detailed image of either one of these sensor ports 4, with a sensor 5 mounted therein. FIG. 2b shows a section view in the vertical symmetry plane of the port 4, but without the sensor.

The images in FIGS. 2a and 2b are included in order to illustrate the problems highlighted in the introductory paragraphs, and which are related to the fact that the muffler 1 comprises a double outer shell, as best visible in FIG. 2b. The shell comprises an inner wall 10 and the outer wall 11. Preferably, thermal insulation material (not shown) is present in the space between these walls 10 and 11. The sensor port 4 comprises a boss 12 that is fixed, preferably welded inside an opening in the inner wall 10 of the shell. The boss 12 comprises a central opening 14, preferably a threaded opening, into which the sensor 5 can be screwed tight.

As seen in the drawings, the outer wall 11 comprises an opening 13 around the boss 12 and the sensor 5 that is considerably larger than the cross-section of the boss 12, in order to allow a movement of the inner and outer walls 10 and 11 relative to each other as a consequence of the temperature difference between the two walls, without damaging the sensor 5. These openings 13 are present around all the sensor ports 4 and represent access locations for dirt, dust or other debris entering the area between the walls 10 and 11.

In a muffler 1 according to the present invention, such openings 13 are closed off from the environment by a sealing assembly as described hereafter. First an embodiment of the sealing assembly is described that is designed to cover a 2-sensor port arrangement similar to the pairs of sensor ports 4 shown in FIG. 1. The invention is however not limited to this particular arrangement, and alternative embodiments will be described further in this specification.

Figure 3A:
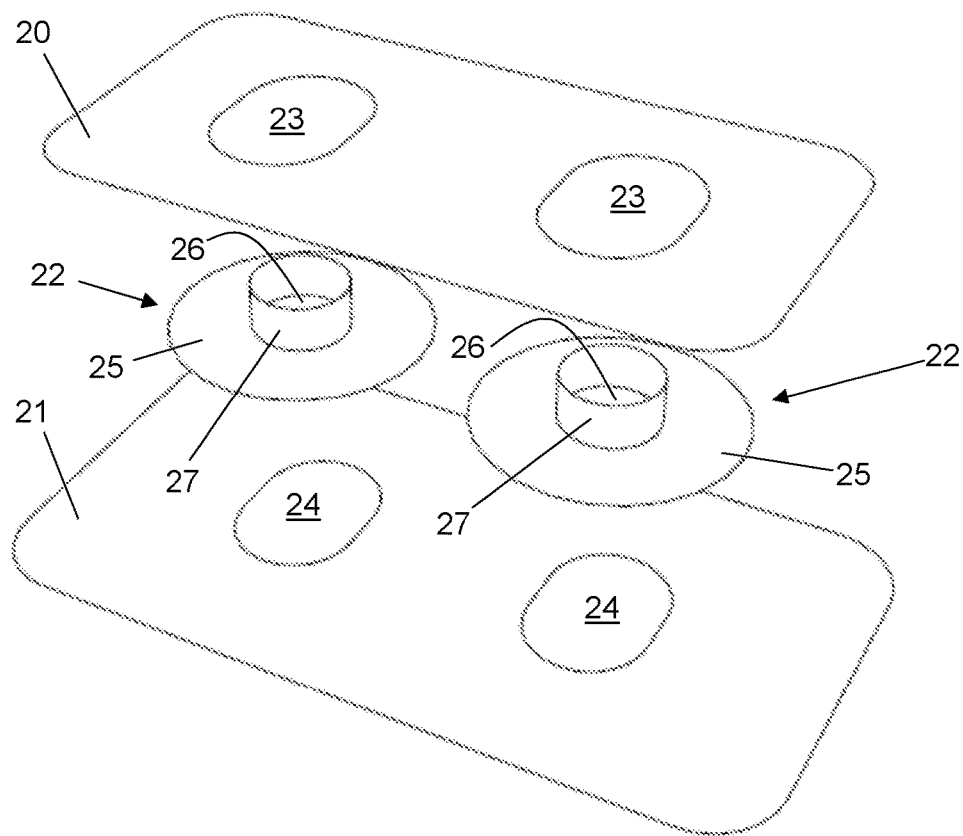
FIG. 3a shows the components of a sealing assembly applicable in a muffler according to the invention.

FIG. 3a shows the components of the sealing assembly before these components are assembled together. The assembly comprises an inner cover plate 20, an outer cover plate 21 and two washer-type elements 22. The term 'washer-type element' is used in the appended claims in order to distinguish these elements from what is technically understood to be a 'washer', i.e. a ring-shaped element used for example for securing bolts. For the sake of brevity, the term 'washer' will nevertheless be used in the detailed description, when referring to the 'washer-type elements' 22.

The terms 'inner plate' and 'outer plate' refer to the position of the cover plates relative to the muffler when the assembly is mounted thereon: the inner plate 20 is closer to the muffler than the outer plate 21.

Both cover plates 20 and 21 are formed of thin steel, preferably stainless steel, which may be as thin as 0.3 mm. It is preferred to use thin plate material which can be easily adapted to the curvature of a muffler and/or to a tilted position of the sensor, which may be required for certain types of sensors. A thicker plate material is however not excluded from the scope of the invention, and the invention is not limited to any particular thickness of the plate material used for the various components of the sealing assembly.

In the embodiment shown, the inner plate 20 is smaller than the outer plate 21 and placed inside the outer circumference of the outer plate, but this is not a requirement. Both plates may have the same outer dimensions or the inner plate 20 could be larger than the outer plate 21, even though it is preferable that only the outer plate 21 is visible when the assembly is mounted on the muffler.

The plates 20 and 21 are each provided with a pair of openings, labelled 23 for the inner plate 20 and 24 for the outer plate 21, and placed relative to each other at a distance corresponding to the distance between two sensor ports onto which the assembly is to be mounted. In the embodiment shown, the openings 23 and 24 in the inner and outer plates have the same shape and size, so that they can be aligned to each other, forming common openings in the assembly of the plates 20 and 21, when these plates are mounted together.

The washers 22 each comprise a planar portion 25 provided with a central aperture 26 and a tube portion 27 protruding from the edge of the central aperture 26. The washers 22 are equally preferably formed of thin stainless steel plate material, preferably having the same thickness as the plates 20 and 21.

Figure 3B:
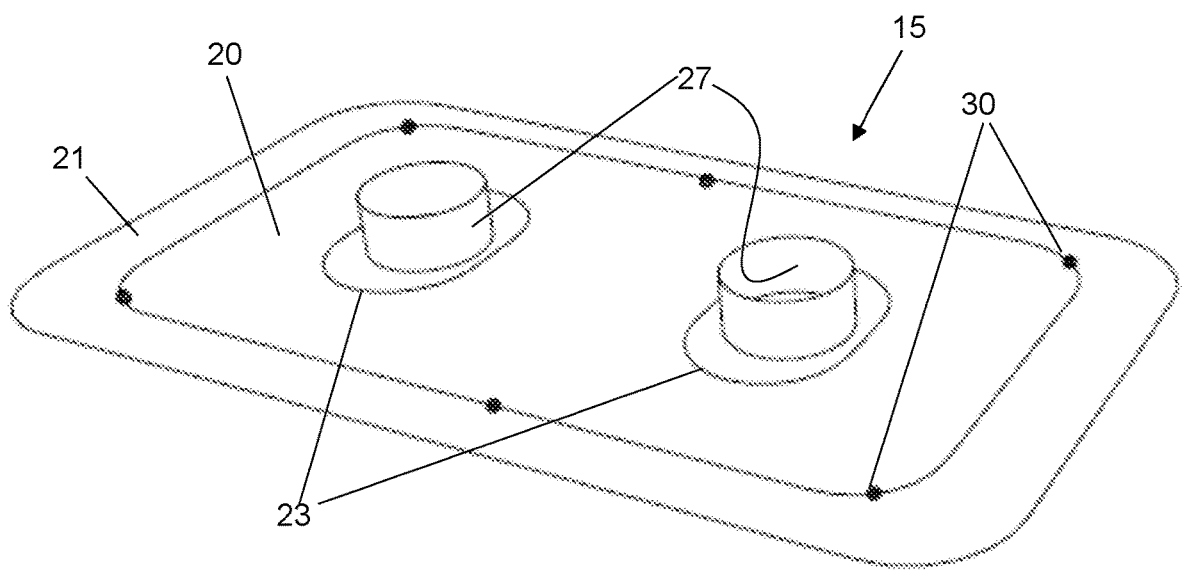
FIG. 3b is an image of the sealing assembly in the assembled state.

When these various components are assembled together, as seen in FIG. 3b, to obtain the sealing assembly 15, the planar portions 25 of the washers 22 are inserted between the inner and outer plates 20 and 21, with the tube portions 27 protruding through the openings 23 of the inner plate 20. The inner and outer plates 20 and 21 are attached to each other by a number of spot welds 30 along the circumference of the inner plate 20, as shown in FIG. 3b. This may also be a continuous weld or any other suitable attachment means. Preferably, the plates 20 and 21 are attached only along the edge of the smaller of the two plates, or along their common edge, when the two plates have the same outer dimensions. In any case, the plates 20 and 21 are not attached to each other across the entirety of their overlapping surfaces. At least in an area around the aligned openings 23 and 24, the plates 20 and 21 are not attached to each other, enabling the washers 22 to shift laterally relative to the plates, i.e. in a direction parallel to the plates. This is enabled also by the fact that the cross section of the outer surface of the tube portion 27 is considerably smaller than the area of the opening 23 in the inner plate 20, through which opening 23 the tube portion 27 is protruding, i.e. there is a considerable gap between the tube portion 27 and the edge of the opening 23.

As noted above, the overlapping openings 23 and 24 are the same in size and in shape in this embodiment and are aligned to each other so that the common opening formed by two aligned openings 23 and 24 in the assembly of the plates 20 and 21 has the same shape and dimensions as the openings themselves. It is however also possible to apply an opening 24 in the outer plate 21 that is larger or smaller than the opening 23 in the inner plate 20 with the openings placed one inside the other, or the openings in the outer and inner plates could partially overlap, so that the common opening is defined by the intersection between the overlapping openings. The common opening is however subjected to conditions related to the dimensions of the boss and/or the sensor, as described hereafter.

Figure 4A:
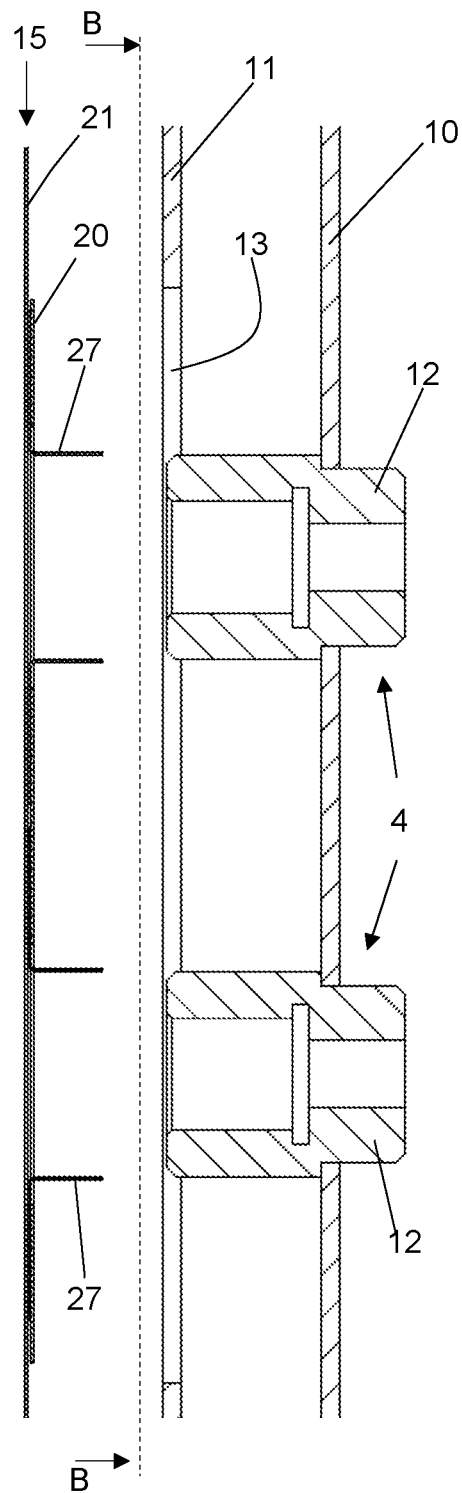
FIG. 4a is a section view of the sealing assembly and of two sensor ports, prior to mounting the assembly onto these ports.
Figure 4B:
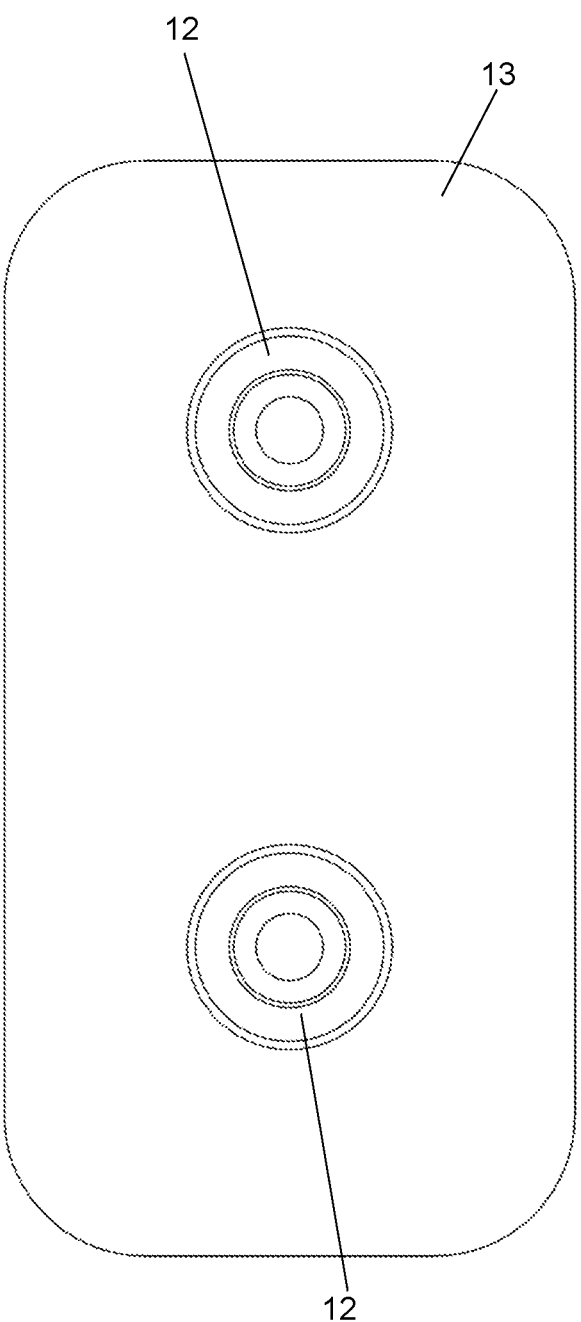
FIG. 4b is a frontal view of the two sensor ports.

FIG. 4a shows the sealing assembly 15 of FIG. 3b, before being mounted on a pair of sensor ports 4, each provided with a boss 12 of the same dimensions. As best seen in the frontal view in FIG. 4b, the outer wall 11 is here provided with one large opening 13 that surrounds the two adjacent sensor ports 4. The tube portions 27 of the assembly are dimensioned in correspondence with the bosses 12, in such a manner that the tube portions 27 can be closely fitted onto said bosses 12, as illustrated in FIGS. 5a and 5b. The assembly is mounted onto the sensor ports 4, by placing the tube portions 27 around the bosses 12 until the outer plate 21 contacts the outer wall 11 of the muffler shell. The outer plate 21 is larger than the opening 13 and fully overlaps this opening. The opening 13, the inner plate 20 and the planar portions 25 of the washers 22 are shown in dotted lines in the frontal view of the mounted assembly in FIG. 5b. In this particular embodiment, the inner plate 20 is smaller than the opening 13 and is positioned inside this opening, but this is not a requirement of the invention (see further). The outer plate 21 can be attached to the outer wall 11 by roll spot seam welding or by any other suitable attachment means.

The tube portions 27 are fitted closely around the bosses 12 so that the assembly effectively closes off the gap between the bosses 12 and the edge of the large opening 13. Nevertheless, the 'close fit' of the tube portions 27 still allows a movement of the bosses 12 relative to the tube portions 27 in a direction perpendicular to the plates 20 and 21, i.e. in a radial direction of the muffler. Radial displacements of the bosses 12 relative to the outer wall 11 are thereby allowed without subjecting the sealing assembly to stress. Also, lateral displacements of the bosses 12 relative to the outer wall 11 are allowed without any danger to the sealing function of the assembly because of the close fit of the tube portions 27 around the bosses 12 and the fact that the washers 22 are moveable relative to the plates 20 and 21 in any direction parallel to these plates. Any lateral movement of the bosses 12 relative to the outer wall 11 is followed by the washers 22, i.e. the washers 22 move along with the bosses 12 by shifting relative to the plates 20 and 21, so that the planar portion 25 of the washers 22 continues to close off the gap between the tube portion 27 and the opening 23 in the inner plate 20, as well as the gap between the boss (and a sensor mounted thereon) and the opening 24 in the outer plate 21. This requires of course that the dimensions of the planar portions 25 are large enough so that the gap between the bosses 12 and the opening 13 in the outer wall 11 is closed off by said planar portions 25 and by the plates 20 and 21, regardless of the position of the boss 12 relative to the outer wall 11.

The sealing function as described above implies that the common opening defined by openings 23 and 24 is sufficiently large compared to the cross section of the bosses 12 and the tubular portions 27, and possibly of the sensors mounted onto the bosses 12, so that the bosses 12 and the tubular portions 27 as well as the sensors remain at a distance from the edge of either of the openings 23 and 24 as the bosses are displaced laterally with respect to these openings. This condition holds regardless of whether the openings 23 and 24 are the same size and shape and fully overlapping (as in the embodiment shown), or whether they are different in size and/or shape.

Figure 6:
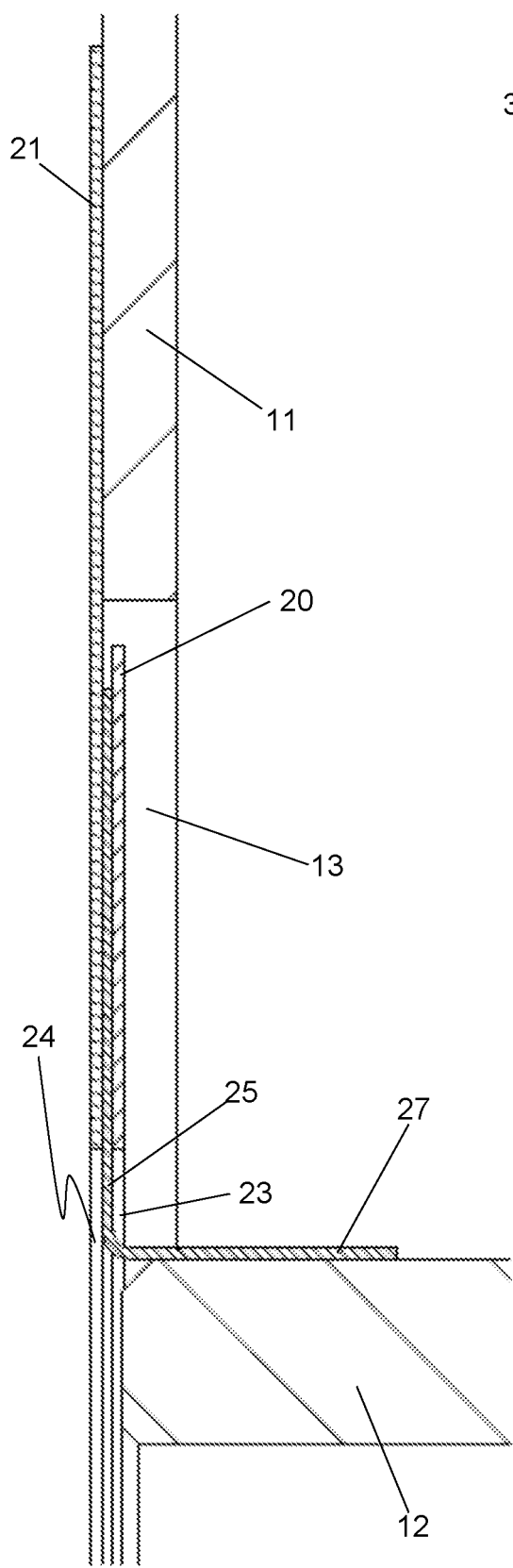
FIG. 6 is a detail of the mounted sealing assembly shown in FIG. 5b, which allows a more detailed view of the positions of the various constituent components.
Figure 7:
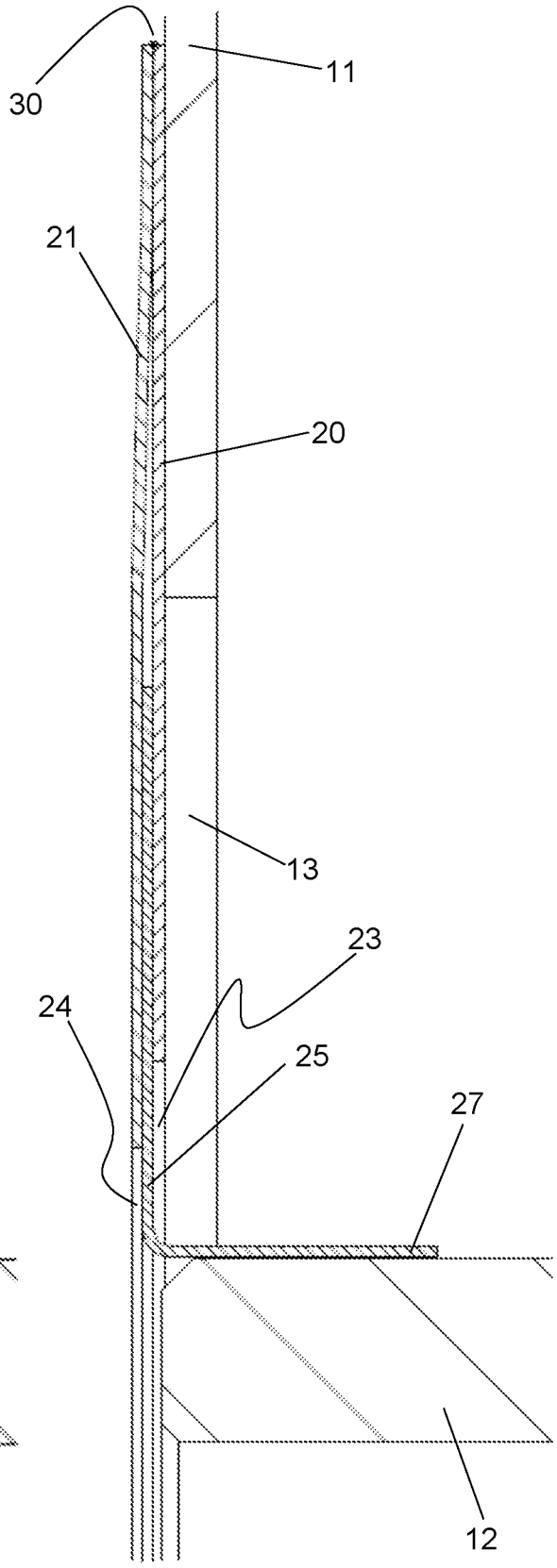
FIG. 7 is a detail of an alternative configuration in terms of the dimensions of the inner and outer plate of the sealing assembly and of the openings provided therein.

A detail (rectangle R indicated in FIG. 5a) of the mounted sealing assembly is shown in FIG. 6, indicating the various components described above. As stated, alternative configurations are possible, for instance in terms of the dimensions of the inner and outer plates 20 and 21 and the way in which the assembly is attached to the outer wall 11 of the muffler. FIG. 7 illustrates an alternative configuration, but others are possible, as is clear to the skilled person. In the embodiment of FIG. 7, the inner and outer plates 20 and 21 have the same outer dimensions. The inner plate 20 is now attached to the outer wall 11 of the muffler. It is seen that the outer plate 21 is slightly bent towards the inner plate 20 in the area outside the washers 22, due to the fact that both plates are formed of thin material. This however does not obstruct the lateral movement of the washers 22 relative to the plates, which is ensured preferably by welding the plates 20 and 21 together only along their outer edges, as for example by a plurality of spot welds 30, as illustrated in FIG. 7. Another difference with the first embodiment, illustrated in FIG. 7, and applicable independently of changes in the relative outer dimensions of the plates, is that the opening 23 in the inner plate 20 is larger than the opening 24 in the outer plate 21. The opening 24 therefore defines the common opening obtained by the overlapping openings 23 and 24.

FIGS. 8a and 8b illustrate a sealing assembly according to the invention, that is suitable for sealing off a single sensor port. The various components described above are present here as well and are indicated in FIGS. 8a and 8b by the same reference numerals. The characteristics and possible alternatives described above are applicable also to this single-port embodiment. Likewise, assemblies according to the invention may be designed for a group of any number of ports higher than 2, by adapting the dimensions and the number of the various components described above. Such embodiments could include higher numbers of cover plates, for example one single outer cover plate 21 and a separate inner cover plate 20 for each sensor port. If the sensor ports are sufficiently close together, a single washer 22 could be provided that is fitted to multiple bosses 12, the washer comprising a single planar portion 25, multiple apertures 26 and multiple tube portions 27 protruding from said apertures 26.

FIG. 9 illustrates an alternative configuration, according to which the sealing assembly is mounted with the tube portion 27 oriented away from the muffler, and fitted to a boss 12 that protrudes outward from the outer wall 11 of the muffler. This is possible only when the boss 12 is effectively realised in this way, i.e. protruding sufficiently beyond the outer wall 11. This embodiment illustrates that the tube portion 27 may protrude through the opening 23 of the inner plate 20 (as in the previous embodiment), or through the opening 24 in the outer plate 21 (as in the embodiment of FIG. 9). Apart from this difference, all the components as well as the characteristics and functionalities described above are applicable also to the embodiment shown in FIG. 9.

According to alternative embodiments of the invention, the inner and the outer cover plates 20 and 21 are not directly attached to each other. According to one such embodiment, the inner plate 20 is maintained in place only by the outer plate 21. In this case, the outer plate 21 must be larger than the inner plate 20 and fully overlap the inner plate, and the inner plate 20 must be considerably larger than the opening 13 in the outer wall 11 of the muffler 1. The outer plate 21 is then fixed to the muffler's outer wall 11, for example by roll spot seam welding in a peripheral area of the outer plate 21, and thereby holds the inner plate 20 against said outer wall 11. Preferably the inner plate 20 is maintained essentially immobile, for example by the fact that the spot seam welds are applied close to the outer circumference of the inner plate 20, and possibly aided by high friction forces between the plates 20 and 21, to avoid that the inner plate 20 becomes displaced relative to the outer plate 21 to such a degree that the sealing function is lost.

When the inner plate 20 is smaller than the outer plate 21 and placed fully within the circumference of the outer plate 21, while being larger than the opening 13 in the outer muffler wall 11, it is also possible to attach both the inner and the outer plate to the muffler wall 11, without attaching them directly to each other. This last embodiment of the sealing assembly cannot be assembled fully before attaching it to the muffler, but it is assembled in the course of attaching it to the muffler. This process comprises: attaching the inner plate 20 to the muffler wall 11, for example by spot seam welds, placing the washer 22 over the boss 12 of the sensor port, and attaching the outer plate 21 to the muffler wall 11, for example also by spot seam welds, so that the washer 22 is mounted between the two plates 20 and 21, thereby realizing the sealing functionality as described above.

Figure 10:
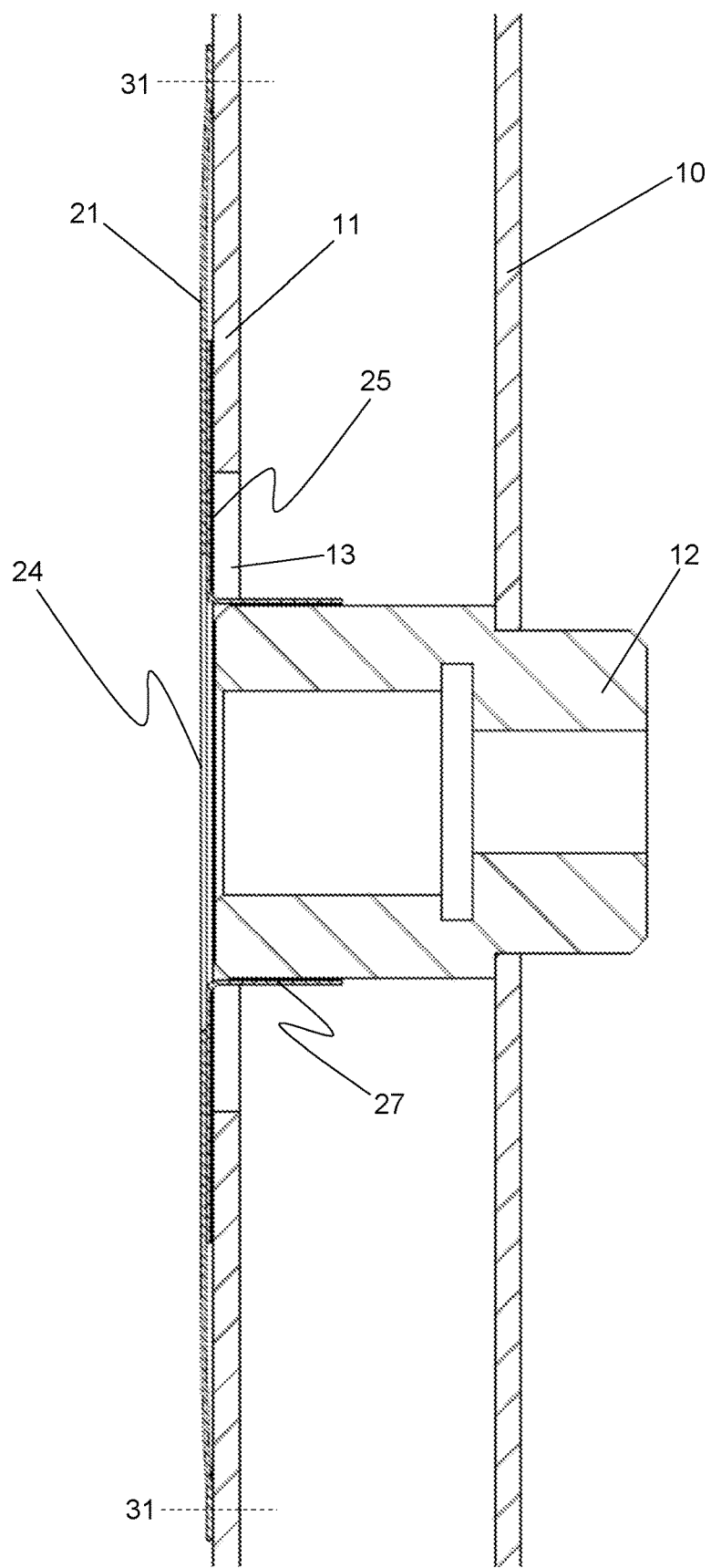
FIG. 10 illustrates an embodiment wherein the sealing assembly comprises a single cover plate.

A further alternative embodiment of the sealing assembly comprises not two plates, but a single cover plate. In this case, the outer plate 21 plays the role of the single cover plate, having an opening 24 that overlaps the opening 13 in the outer muffler wall 11. This embodiment is illustrated in FIG. 10. The planar portion 25 of the washer 22 is now held between the single cover plate 21 and the outer wall 11 of the muffler. The cover plate 21 is attached to the muffler wall for example by spot seam welds, indicated by the dotted lines 31, in a peripheral area of the plate 21. This leaves sufficient area between the plate 21 and the muffler wall 11 for the washer 22 to move relative to said muffler wall 11 and relative to the plate 21, in a direction parallel to the wall 11. The tube portion 27 of the washer 22 is fitted to the boss 12 in the same way as described above for the embodiments comprising two cover plates. The single plate embodiment is equally preferably assembled as it is being attached to the muffler, by the steps of: fitting the washer 22 over the boss 12, and placing the planar portion 25 of the washer against the outer wall 11 of the muffler, followed by placing the single cover plate 21 over the washer 22 and attaching the plate 21 to the outer wall 11, for example by spot seam welds 31.

The latter embodiment can also be applied to seal off a group of closely spaced sensor ports 4, by providing a single cover plate 21 and a separate washer 22 for each sensor port, when each sensor port is provided with its own opening 13 around the boss 12. When one opening 13 surrounds multiple bosses 12, it would be possible to provide a single cover plate 21 and one or more washers 22 that comprise a single planar portion 25 having multiple apertures 26 with multiple tube portions 27 protruding from the apertures of the single planar portion 25.

According to any embodiment of the sealing assembly (single plate or inner/outer plate), the outer cover plate 21 is attached to the outer wall 11 of the muffler. In most embodiments said outer cover plate 21 is attached directly to said wall. When the outer plate 21 is smaller than the inner plate 20, the outer plate is directly attached to the inner plate 20, said inner plate being directly attached to the muffler wall. So in this case the outer plate 21 is attached to the muffler wall 11 via the inner plate, which also represents an embodiment of the outer plate being 'attached to the outer wall of the muffler'.

Also according to any embodiment, the planar portion 25 of the washer 22 is mounted between the outer cover plate 21 and the muffler. When the sealing assembly comprises an inner plate as well, the planar portion 25 is mounted between the plates 20 and 21, and is thereby still 'between the outer plate and the muffler'.

The invention claimed is:

1. A muffler comprising:
   an inner wall;
   an outer wall;
   at sensor port comprising a boss configured to receive a sensor, wherein the boss is fixed to the inner wall, and wherein the outer wall defines an opening around the boss; and
   a sealing assembly comprising:
      one or more cover plates comprising at least an outer cover plate coupled to the outer wall, the one or more cover plates defining an opening that overlaps the opening around the boss; and
      at washer-type element comprising:
         a planar portion positioned between the muffler and the outer cover plate, the planar portion defining an aperture; and
         a tube portion protruding from an edge of the aperture of the planar portion and through the opening of the outer cover plate or the opening of the outer wall of the muffler, the tube portion receiving the boss of the sensor port therethrough,
   wherein:
      the washer-type element moves with the boss in a direction parallel to the outer wall of the muffler and relative to the outer wall and the one or more cover plates.

2. The muffler according to claim 1, wherein the washer-type element is held against the outer muffler wall by the outer cover plate.

3. The muffler according to claim 2, wherein the sensor port comprises two or more sensor ports placed in a group and each comprising a boss, and wherein the opening in the outer wall of the muffler is at least one opening placed around the bosses, wherein:
   the sealing assembly further comprises a single outer plate provided with multiple openings corresponding to a number of the two or more sensor ports; and
   the washer-type element comprises multiple washer-type elements, a number of the multiple washer-type elements corresponding to a number of the two or more sensor ports.

4. The muffler according to claim 1, wherein the sealing assembly further comprises an inner cover plate and wherein:
   the inner cover plate and the outer cover plate are assembled one on top of the other and comprise openings that mutually overlap,
   the inner cover plate and the outer cover plate have either a common outer edge or one plate is smaller than the other and placed inside the outer edge of the other,
   the planar portion of the washer-type element is mounted between the inner cover plate and the outer cover plate with the tube portion protruding:
      either through the opening of the inner cover plate and the opening in the outer wall of the muffler, or
      through the opening of the outer cover plate,
   the inner cover plate and the outer cover plate are arranged relative to each other in a way that allows movement of the washer-type element relative to the inner cover plate and the outer cover plate in a direction parallel to the inner cover plate and the outer cover plate, wherein the movement is also enabled by the dimensions of the overlapping openings
   the sealing assembly is attached to the outer wall of the muffler with the outer cover plate facing away from the muffler, wherein depending on relative dimensions of the inner cover plate and the outer cover plate one of the following cases applies:
      only the outer cover plate is directly attached to the outside wall of the muffler, or
      only the inner cover plate is directly attached to the outside wall of the muffler and the outer cover plate is directly attached to the inner cover plate, or both the inner cover plate and the outer cover plate are directly attached to the outside wall of the muffler.

5. The muffler according to claim 4, wherein the mutually overlapping openings of the inner cover plate and the outer cover plate have a same size and a same shape and are aligned to each other.

6. The muffler according to claim 5, wherein the inner cover plate and the outer cover plate are attached to each other only along their common outer edge or only along the edge of the smaller of the two cover plates.

7. The muffler according to claim 4, wherein the inner cover plate and the outer cover plate are attached to each other.

8. The muffler according to claim 4, wherein:
the inner cover plate is positioned inside a circumference of the opening defined by the outer wall of the muffler, and
the outer cover plate is attached to the outer wall of the muffler.

9. The muffler according to claim 4, wherein the inner cover plate is larger than and fully overlaps the opening defined by the outer wall of the muffler.

10. The muffler according to claim 4, wherein the sensor port comprises two or more sensor ports placed in a group and each comprising a boss, and wherein the opening in the outer wall of the muffler is at least one opening placed around the bosses, and wherein:
the sealing assembly further comprises a single inner plate and a single outer plate, each provided with multiple openings corresponding to a number of the two or more ports,
the washer-type element comprises multiple washer-type elements, a number of the multiple washer-type elements corresponding to a number of the two or more ports.

11. The muffler according to claim 1, wherein the one or more cover plates and the washer-type element are formed of thin plate material.

12. A sealing assembly for covering an opening around a sensor port, the opening being defined by an outer wall of a double wall of a muffler, the double wall comprising an inner wall and the outer wall, the sensor port comprising a boss fixed to the inner wall and placed inside a surface area of the opening, the sealing assembly comprising:
one or more cover plates comprising at least an outer cover plate defining an opening configured to overlap the opening around the boss; and
at washer-type element comprising:
a planar portion positioned between the muffler and the outer cover plate, the planar portion defining an aperture; and
a tube portion protruding from an edge of the aperture of the planar portion and through the opening of the outer cover plate or the opening of the outer wall of the muffler, the tube portion receiving the boss of the sensor port therethrough. wherein:
the washer-type element is configured to move with the boss in a direction parallel to the outer wall of the muffler and relative to the outer wall and the one or more cover plates.

13. The sealing assembly according to claim 12, comprising the outer cover plate and an inner cover plate, wherein:
the cover plates are assembled one on top of the other and comprise openings that mutually overlap,
the cover plates have either a common outer edge or one cover plate is smaller than the other and placed inside the outer edge of the other,
the planar portion is mounted between the two cover plates with the tube portion protruding through the opening of the inner cover plate or through the opening of the outer cover plate, and
the cover plates are arranged relative to each other in a way that allows movement of the washer-type element relative to the cover plates in a direction parallel to the cover plates, wherein the movement is also enabled by the dimensions of the overlapping openings.

14. The sealing assembly according to claim 13, wherein the inner cover plate and the outer cover plate are attached to each other.

15. The sealing assembly according to claim 12, wherein the one or more cover plates and the washer-type element are formed of thin plate material.

16. A muffler comprising:
an inner wall;
an outer wall;
a plurality of sensor ports each comprising a boss of a plurality of bosses each configured to receive a sensor, wherein each boss is fixed to the inner wall and the outer wall defines an opening around the plurality of bosses; and
a sealing assembly comprising:
an outer cover plate coupled to the outer wall, the outer cover plate defining a plurality of openings corresponding to a number of the plurality of bosses, the plurality of openings of the outer cover plate each overlapping the opening of the outer wall; and
a plurality of washer-type elements each corresponding to one of the bosses of the plurality of bosses, each washer-type element comprising:
a planar portion positioned between the muffler and the outer cover plate such that the washer-type element is configured to move relative to the outer cover plate in a direction parallel to the outer cover plate, the planar portion defining an aperture; and
a tube portion protruding from an edge of the aperture of the planar portion and through one of the openings of the plurality of openings of the outer cover plate or the opening of the outer wall of the muffler, the tube portion receiving one of the bosses of the plurality of bosses therethrough,
wherein:
when the boss moves relative to the outer cover plate in the direction parallel to the outer cover plate, the tube portion and, thus, the washer-type element, move together relative to the outer cover plate, and
each washer-type element is maintained against the outer wall of the muffler by the outer cover plate.

17. A muffler comprising:
an inner wall;
an outer wall;
a sensor port comprising a boss configured to receive a sensor, wherein the boss is fixed to the inner wall, and wherein the outer wall defines an opening around the boss; and
a sealing assembly comprising:
a set of cover plates including an inner cover plate and an outer cover plate coupled together, each cover plate defining an opening that overlaps the opening of the other cover plate and the opening around the boss, the outer cover plate coupled to the outer wall of the muffler;

a washer-type element comprising:
- a planar portion positioned between the set of cover plates such that the washer-type element is configured to move relative to the set of cover plates in a direction parallel to the set of cover plates, the planar portion defining an aperture; and
- a tube portion protruding from an edge of the aperture of the planar portion and through the opening of the inner cover plate and the opening of the outer wall of the muffler, or through the opening of the outer cover plate, the tube portion receiving the boss of the sensor port therethrough, wherein:
when the boss moves relative to the set of cover plates in the direction parallel to the set of cover plates, the tube portion and, thus, the washer-type element, move together relative to the set of cover plates, and the openings defined by each of the cover plates of the set of cover plates enable movement of the washer-type element relative to the set of cover plates in the parallel direction.

18. The muffler of claim 17, wherein the opening of the inner cover plate and the opening of the outer cover plate have a same size and a same shape and are aligned to each other.

19. The muffler of claim 17, wherein:
the inner cover plate is positioned inside a circumference of the opening defined by the outer wall of the muffler, and the outer cover plate is attached to the outer wall of the muffler.

20. The muffler of claim 17, wherein the inner cover plate is larger than and fully overlaps the opening defined by the outer wall of the muffler.

* * * * *